(12) United States Patent
Yang et al.

(10) Patent No.: US 11,355,980 B2
(45) Date of Patent: Jun. 7, 2022

(54) ELECTRIC MOTOR AND ROTOR END RING

(71) Applicant: GM Global Technology Operations LLC, Detroit, MI (US)

(72) Inventors: Xiaofeng Yang, Troy, MI (US); Scott E. Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 16/860,692

(22) Filed: Apr. 28, 2020

(65) Prior Publication Data
US 2021/0336500 A1 Oct. 28, 2021

(51) Int. Cl.
*H02K 1/32* (2006.01)

(52) U.S. Cl.
CPC ...................... *H02K 1/32* (2013.01)

(58) Field of Classification Search
CPC ............. H02K 1/32; H02K 5/203; H02K 5/15
USPC .......................................................... 310/54
See application file for complete search history.

(56) References Cited

U.S. PATENT DOCUMENTS

| | | | | |
|---|---|---|---|---|
| 5,744,880 A * | 4/1998 | Kudoh | ...................... | H02K 9/22 310/58 |
| 5,925,960 A * | 7/1999 | Hayes | .................. | H02K 17/165 310/211 |
| 11,081,921 B2 * | 8/2021 | Yoshizawa | ............... | H02K 1/32 |
| 2010/0194220 A1 * | 8/2010 | Tatematsu | ............ | H02K 1/2766 310/61 |
| 2010/0237725 A1 * | 9/2010 | Tatematsu | ............... | B60L 50/16 310/61 |
| 2011/0298316 A1 * | 12/2011 | Bradfield | ................. | H02K 5/20 310/58 |
| 2011/0298317 A1 * | 12/2011 | Bradfield | ................. | H02K 9/19 310/58 |
| 2011/0309698 A1 * | 12/2011 | Kirkley, Jr. | ............. | H02K 5/20 310/54 |
| 2012/0126642 A1 * | 5/2012 | Miyamoto | ............... | H02K 3/24 310/54 |
| 2017/0288506 A1 * | 10/2017 | Asagara | ................. | H02K 7/116 |

FOREIGN PATENT DOCUMENTS

WO WO-2018181244 A1 * 10/2018 ............... H02K 1/32

* cited by examiner

*Primary Examiner* — Alex W Mok
(74) *Attorney, Agent, or Firm* — Vivacqua Crane, PLLC

(57) ABSTRACT

An electric motor comprises a housing, a stator mounted stationary within the housing and having end turn windings, a rotatable central shaft, a rotor mounted onto the central shaft for rotation within the stator, the stator, central shaft and rotor all positioned co-axially within the housing, a rotor end ring mounted onto the central shaft adjacent an axial end of the rotor, the rotor end ring including a body, a plurality of outlets adapted to allow coolant to flow from a back side to a face of the body, and a recess formed within the face of the body, wherein coolant flowing through the outlets flows across the recess toward an outer circumference of the body, and the outer circumference of the body is configured to prevent coolant from flowing into a circumferential air gap between the stator and the rotor.

18 Claims, 3 Drawing Sheets

ELECTRIC MOTOR AND ROTOR END RING

INTRODUCTION

The present disclosure relates to an electric motor having a rotor end ring. Specifically, a rotor end ring of the present disclosure provides improved spray of coolant onto the stator end turn windings and reduces the likelihood that coolant will filter back past an outer circumference of the rotor end ring and into the air gap between the stator and the rotor.

Coolant is routed through the rotor to provide cooling of the rotor during operation. Electrical currents flowing within an electric motor create heat, and if some of that heat is not removed, damage or failure of the electric motor can occur. Coolant that flows through the rotor passes out from the rotor at either axial end. As the rotor is spinning, circumferential forces cause the coolant to flow radially outward past the rotor and ultimately onto the end turn windings of the stator.

In current electric motors, the coolant flows radially outward and contacts the end turn windings of the stator at a localized point adjacent the rotor. Further, there is a possibility that some of the coolant flowing radially outward will leak back into the air gap between the stator and the rotor, causing spin losses in the electric motor.

Thus, while current technologies achieve their intended purpose, there is a need for a new and improved electric motor having a roto end ring adapted to spray coolant radially outward onto the end turn windings of the stator and including an outer circumference adapted to minimize leakage of coolant into the air gap between the stator and the rotor.

SUMMARY

According to several aspects of the present disclosure, a rotor end ring for an electric motor includes an annular disk shaped body, a plurality of outlets adapted to allow coolant to flow from a back side of the body to a face of the body, and a recess formed within the face of the body, wherein coolant flowing through the outlets flows across the recess toward an outer circumference of the body, wherein the outer circumference of the body is configured to prevent coolant from flowing across the outer circumference from the face of the body toward the back side of the body.

According to another aspect, the outer circumference of the body is beveled radially inward from the face toward the back side at an angle relative to a central axis of the body.

According to another aspect, the outer circumference of the body is beveled radially inward from the face toward the back side at an angle relative to a central axis of the body that is between approximately zero degrees and forty-five degrees.

According to another aspect, a portion of the face of the body surrounding the recess formed within the face is adapted to direct coolant flowing from the outlets radially outward from the rotor end ring.

According to another aspect, the rotor end ring further includes a ramped portion extending from the face and circumferentially around the recess and adapted to spray coolant that flows from the recess and across the ramped portion radially outward from the rotor end ring.

According to another aspect, the ramped portion defines an outer diameter and an angled surface.

According to another aspect, the outer diameter of the ramped portion is co-axial with and parallel to the central axis of the body.

According to another aspect, the outer diameter of the ramped portion defines a longitudinal length.

According to another aspect, the angled surface extends from the face, radially outward at an angle relative to the face, to the outer diameter of the ramped portion.

According to another aspect, the angled surface extends linearly from the face, radially outward to the outer diameter of the ramped portion at an angle relative to the face that is between approximately zero degrees and seventy-five degrees.

According to several aspects of the present disclosure, a rotor end ring for an electric motor includes a annular disk shaped body having an outer circumference that is beveled radially inward from the face toward the back side at an angle relative to a central axis of the body, the outer circumference of the body configured to prevent coolant from flowing across the outer circumference from the face of the body toward the back side of the body, a plurality of outlets adapted to allow coolant to flow from a back side of the body to a face of the body, a recess formed within the face of the body, wherein coolant flowing through the outlets flows across the recess toward an outer circumference of the body, and a ramped portion extending from the face and circumferentially around the recess and adapted to spray coolant that flows from the recess and across the ramped portion radially outward from the rotor end ring, the ramped portion defining an outer diameter that is co-axial with and parallel to the central axis of the body and an angled surface extending from the face, radially outward at an angle relative to the face, to the outer diameter of the ramped portion.

According to another aspect, the outer circumference of the body is beveled radially inward from the face toward the back side at an angle relative to a central axis of the body that is between approximately zero degrees and forty-five degrees.

According to another aspect, the outer diameter of the ramped portion defines a longitudinal length.

According to another aspect, the angled surface extends linearly from the face, radially outward to the outer diameter of the ramped portion at an angle relative to the face that is between approximately zero degrees and seventy-five degrees.

According to several aspects of the present disclosure, an electric motor includes a housing, a stator mounted stationary within the housing and having end turn windings, a rotatable central shaft, a rotor mounted onto the central shaft for rotation within the stator, the stator, central shaft and rotor all positioned co-axially within the housing, and a rotor end ring mounted onto the central shaft adjacent an axial end of the rotor, the rotor end ring including an annular disk shaped body, a plurality of outlets adapted to allow coolant to flow from a back side of the body to a face of the body, and a recess formed within the face of the body, wherein coolant flowing through the outlets flows across the recess toward an outer circumference of the body, wherein the outer circumference of the body is configured to prevent coolant from flowing across the outer circumference from the face of the body toward the back side of the body and into a circumferential air gap between the stator and the rotor.

According to another aspect, the outer circumference of the body is beveled radially inward from the face toward the back side at an angle relative to a central axis of the body.

According to another aspect, the rotor end ring further includes a ramped portion extending from the face and circumferentially around the recess and adapted to spray coolant that flows from the recess and across the ramped portion radially outward from the rotor end ring.

According to another aspect, the ramped portion of the rotor end ring defines an outer diameter that is co-axial with and parallel to the central axis of the body and an angled surface.

According to another aspect, the outer diameter of the ramped portion defines a longitudinal length.

According to another aspect, the angled surface extends linearly from the face, radially outward to the outer diameter of the ramped portion at an angle relative to the face that is between approximately zero degrees and seventy-five degrees.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
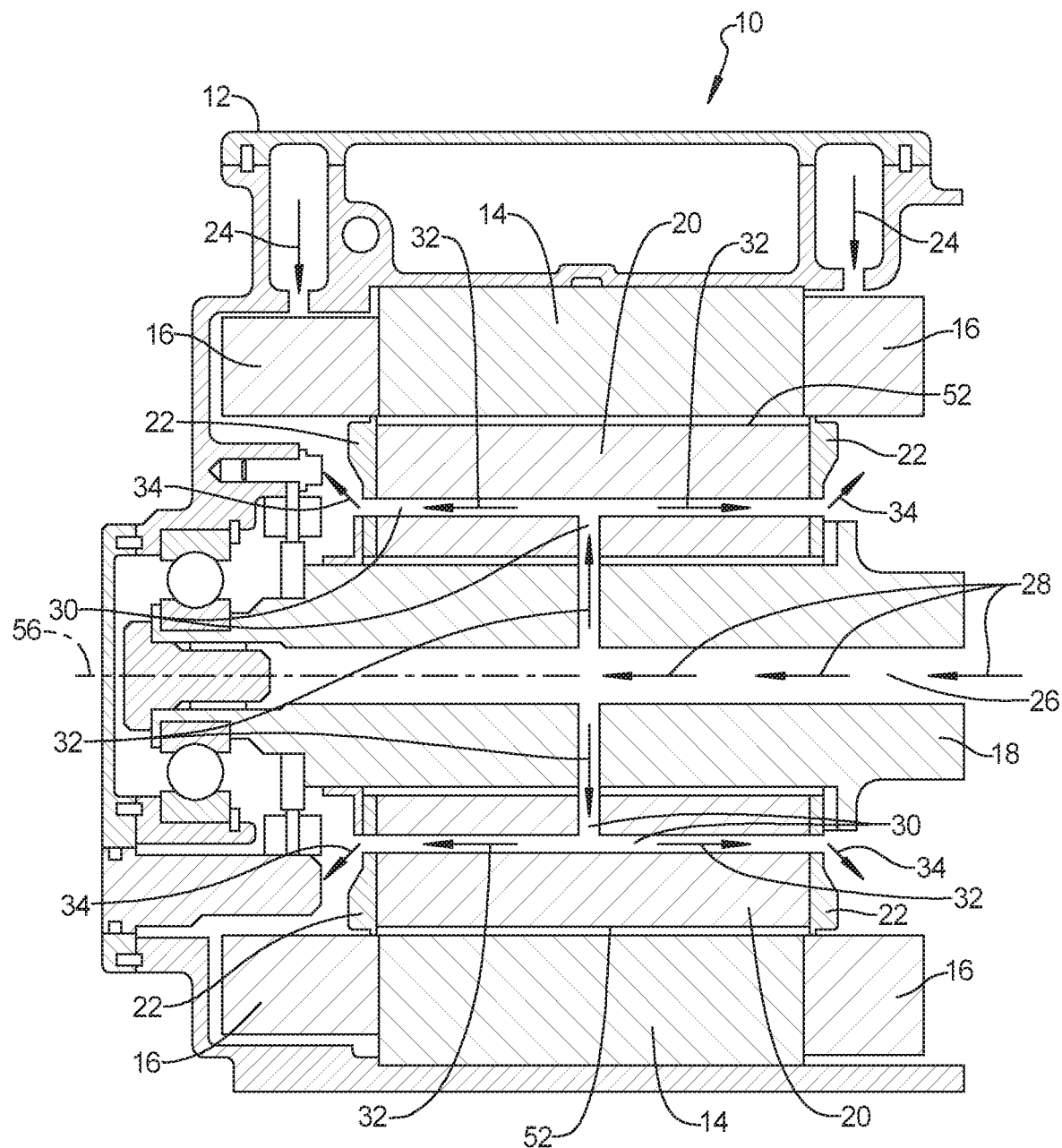
FIG. 1 is a sectional view of an electric motor according to an exemplary embodiment of the present disclosure.

Referring to FIG. 1, an electric motor 10 according to an exemplary embodiment of the present invention includes a housing 12. A stator 14 is mounted stationary within the housing 12. The stator 14 is generally cylindrical in shape and includes end turn windings 16 on either axial end thereof. A rotatable central shaft 18 is supported by and extends longitudinally within the housing 12. A rotor 20 is mounted onto the central shaft 18 for rotation within the stator 14. The stator 14, central shaft 18 and rotor 20 are all positioned co-axially within the housing 12. A rotor end ring 22 is mounted onto the central shaft 18 adjacent each axial end of the rotor 20. The central shaft 18, the rotor 20 and the rotor end ring 22 rotate unitarily within the housing 12.

Heat is generated by electric current running through the electric motor 10. Coolant is circulated through the electric motor to remove heat and prevent the electric motor from overheating. Coolant is directed radially inward onto the end turn windings 16 of the stator 14 as shown by arrows 24. In addition, coolant flows into the electric motor 10 through a bore 26 formed within the central shaft 18, as indicated by arrows 28. Passages 30 allow the coolant to flow radially outward into the rotor 20 and longitudinally toward opposing axial ends of the rotor 20, as indicated by arrows 32. The coolant then flows through the rotor end ring 22 and is directed radially outward toward the end turn windings 16 of the stator 14, as indicated by arrows 34.

Figure 2:
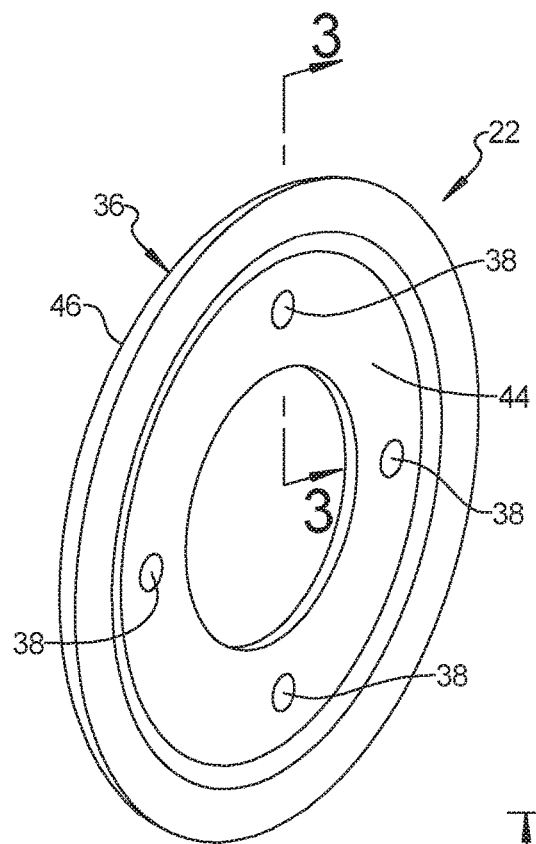
FIG. 2 is a perspective view of a rotor end ring according to an exemplary embodiment of the present disclosure.
Figure 3:
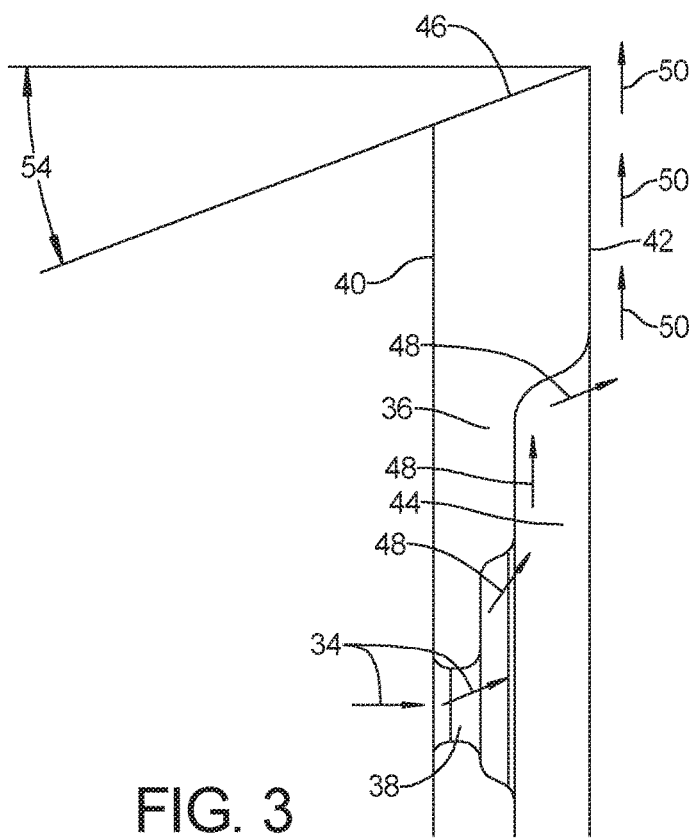
FIG. 3 is a sectional view taken along lines 3-3 of FIG. 2.

Referring to FIG. 2 and FIG. 3, the rotor end ring 22 includes an annular disk shaped body 36 and a plurality of outlets 38 extending through the body 36. The outlets 38 are equidistantly spaced from one another in a circular pattern. The outlets 38 are adapted to allow coolant to flow from a back side 40 of the body 36 to a face 42 of the body 36. Coolant passing through the rotor 20 exits the rotor 20 through the outlets 38 formed within the rotor end ring 22, as indicated by arrows 34.

A circular recess 44 is formed within the face 42 of the body 36. Referring to FIG. 3, coolant flowing through the outlets 38, as indicated by arrows 34, flows across the recess 44, as indicated by arrows 48, and toward an outer circumference 46 of the body 36, as indicated by arrows 50. Ultimately, the coolant flows across the recess 44, radially outward toward the outer circumference 46 of the body 36, and radially outward onto the end turn windings 16 of the stator 14 to provide additional cooling of the end turn windings 14. Due to the spinning of the rotor end ring 22, the coolant is propelled by circumferential forces across the face 42 of the rotor end ring 22 at relatively high velocity and provides more efficient cooling of the end turn windings 16, compared to the coolant that falls radially inward onto the end turn windings 16, as indicated by arrows 24.

Referring again to FIG. 1, there is an air gap 52 between the stator 14 and the rotor 20. Coolant entering the air gap 52 results in spin losses within the electric motor 10. The outer circumference 46 of the body 36 is configured to prevent coolant from flowing longitudinally across the outer circumference 46 from the face 42 of the body 36 toward the back side 40 of the body 36.

Referring to FIG. 3, the outer circumference 46 of the body 36 is beveled radially inward from the face 42 toward the back side 40 at an angle 54 relative to a central axis 56 of the body 36. In an exemplary embodiment, the outer circumference 46 of the body 36 is beveled radially inward from the face 42 toward the back side 40 at an angle 54 relative to a central axis 56 of the body 36 that is between approximately zero degrees and forty-five degrees. The angle 54 of the outer circumference 46 may be any suitable angle depending upon the design and specific requirements of a particular application.

Figure 4:
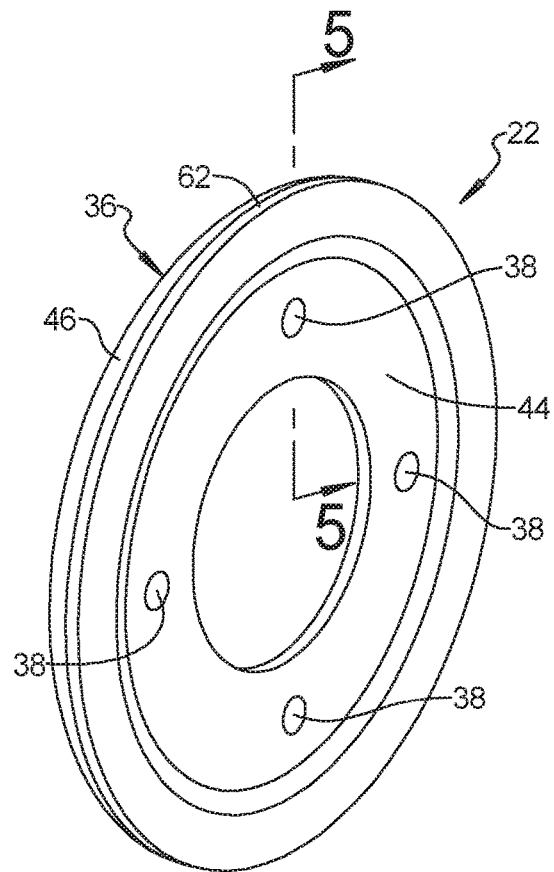
FIG. 4 is a perspective view of a rotor end ring according to an exemplary embodiment of the present disclosure.
Figure 5:
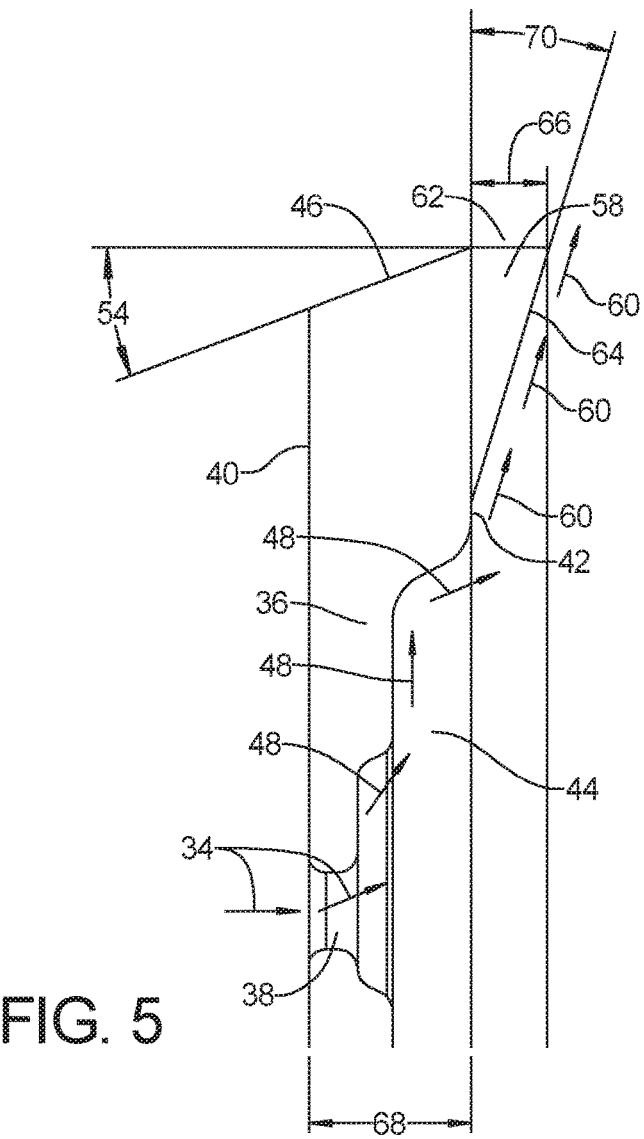
FIG. 5 is a sectional view taken along lines 5-5 of FIG. 4.

To effectively spray coolant radially outward onto the end turn windings 16 of the stator 14, a portion of the face 42 of the body 36 surrounding the recess 44 formed within the face 42 is adapted to direct coolant flowing from the outlets 38 radially outward from the rotor end ring 22. Referring to FIG. 4 and FIG. 5, in an exemplary embodiment, the rotor end ring 22 includes a ramped portion 58 extending from the face 42 and circumferentially around the recess 44. The ramped portion 58 is adapted to spray coolant that flows from the recess 44 and across the ramped portion 58, as indicated by arrows 60, radially outward from the rotor end ring 22 onto the end turn windings 16 of the stator 14.

The ramped portion 58 defines an outer diameter 62 and an angled surface 64. In an exemplary embodiment, the outer diameter 62 of the ramped portion 58 is co-axial with and parallel to the central axis 56 of the body 36. In an exemplary embodiment, the outer diameter 62 has a longitudinal length 66 that is less than a thickness 68 of the body 36. The longitudinal length 66 of the outer diameter 62 may be any suitable length depending upon the design and specific requirements of a particular application.

The angled surface 64 extends from the face 42, radially outward at an angle 70 relative to the face 42, to the outer diameter 62 of the ramped portion 58. In an exemplary embodiment, the angled surface 64 extends linearly from the face 42, radially outward to the outer diameter 62 of the ramped portion 58 at an angle 70 relative to the face that is between approximately zero degrees and seventy-five degrees. The angle 70 of the angled surface 64 of the ramped portion 58 may be any suitable angle depending upon the design and specific requirements of a particular application.

An electric motor 10 and rotor end ring 22 according to the present disclosure offers several advantages. These include reduction/prevention of coolant flowing into the air gap 52 between the stator 14 and the rotor 20, and improved dispersion of coolant radially outward onto the end turn windings 16 of the stator 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor end ring for an electric motor comprising:
   an annular disk shaped body;
   a plurality of outlets adapted to allow coolant to flow from a back side of the body to a face of the body; and
   a recess formed within the face of the body, wherein coolant flowing through the outlets flows across the recess toward an outer circumference of the body;
   wherein the outer circumference of the body is beveled radially inward from the face toward the back side at an angle relative to a central axis of the body and configured to prevent coolant from flowing across the outer circumference from the face of the body toward the back side of the body.

2. The rotor end ring of claim 1, wherein the outer circumference of the body is beveled radially inward from the face toward the back side at an angle relative to a central axis of the body that is between approximately zero degrees and forty-five degrees.

3. The rotor end ring of claim 1, wherein a portion of the face of the body surrounding the recess formed within the face is adapted to direct coolant flowing from the outlets radially outward from the rotor end ring.

4. The rotor end ring of claim 3, further including a ramped portion extending from the face and circumferentially around the recess and adapted to spray coolant that flows from the recess and across the ramped portion radially outward from the rotor end ring.

5. The rotor end ring of claim 4, wherein the ramped portion defines an outer diameter and an angled surface.

6. The rotor end ring of claim 5, wherein the outer diameter of the ramped portion is co-axial with and parallel to the central axis of the body.

7. The rotor end ring of claim 6, wherein the outer diameter of the ramped portion defines a longitudinal length.

8. The rotor end ring of claim 7, wherein the angled surface extends from the face, radially outward at an angle relative to the face, to the outer diameter of the ramped portion.

9. The rotor end ring of claim 8, wherein the angled surface extends linearly from the face, radially outward to the outer diameter of the ramped portion at an angle relative to the face that is between approximately zero degrees and seventy-five degrees.

10. A rotor end ring for an electric motor comprising:
    an annular disk shaped body;
    a plurality of outlets adapted to allow coolant to flow from a back side of the body to a face of the body, the body having an outer circumference that is beveled radially inward from the face toward the back side at an angle relative to a central axis of the body, the outer circumference of the body configured to prevent coolant from flowing across the outer circumference from the face of the body toward the back side of the body; and
    a recess formed within the face of the body, wherein coolant flowing through the outlets flows across the recess toward an outer circumference of the body;
    a ramped portion extending from the face and circumferentially around the recess and adapted to spray coolant that flows from the recess and across the ramped portion radially outward from the rotor end ring, the ramped portion defining an outer diameter that is co-axial with and parallel to the central axis of the body and an angled surface extending from the face, radially outward at an angle relative to the face, to the outer diameter of the ramped portion.

11. The rotor end ring of claim 10, wherein the outer circumference of the body is beveled radially inward from the face toward the back side at an angle relative to a central axis of the body that is between approximately zero degrees and forty-five degrees.

12. The rotor end ring of claim 10, wherein the outer diameter of the ramped portion defines a longitudinal length.

13. The rotor end ring of claim 10, wherein the angled surface extends linearly from the face, radially outward to the outer diameter of the ramped portion at an angle relative to the face that is between approximately zero degrees and seventy-five degrees.

14. An electric motor comprising:
    a housing;
    a stator mounted stationary within the housing and having end turn windings;
    a rotatable central shaft;
    a rotor mounted onto the central shaft for rotation within the stator, the stator, central shaft and rotor all positioned co-axially within the housing;
    a rotor end ring mounted onto the central shaft adjacent an axial end of the rotor, the rotor end ring including:
    an annular disk shaped body;
    a plurality of outlets adapted to allow coolant to flow from a back side of the body to a face of the body; and
    a recess formed within the face of the body, wherein coolant flowing through the outlets flows across the recess toward an outer circumference of the body;
    wherein the outer circumference of the body is beveled radially inward from the face toward the back side at an angle relative to a central axis of the body and configured to prevent coolant from flowing across the outer circumference from the face of the body toward the back side of the body and into a circumferential air gap between the stator and the rotor.

15. The electric motor of claim 14, wherein the rotor end ring further includes a ramped portion extending from the face and circumferentially around the recess and adapted to spray coolant that flows from the recess and across the ramped portion radially outward from the rotor end ring.

16. The electric motor of claim 15, wherein the ramped portion of the rotor end ring defines an outer diameter that is co-axial with and parallel to the central axis of the body and an angled surface.

17. The electric motor of claim 16, wherein the outer diameter of the ramped portion defines a longitudinal length.

18. The electric motor of claim 17, wherein the angled surface extends linearly from the face, radially outward to the outer diameter of the ramped portion at an angle relative to the face that is between approximately zero degrees and seventy-five degrees.

\* \* \* \* \*